(12) United States Patent
Park et al.

(10) Patent No.: US 10,507,835 B2
(45) Date of Patent: Dec. 17, 2019

(54) SYSTEM FOR CONTROLLING CORNERING OF VEHICLE AND METHOD THEREOF

(71) Applicants: HYUNDAI MOTOR COMPANY, Seoul (KR); KIA MOTORS CORPORATION, Seoul (KR)

(72) Inventors: Sangjun Park, Seoul (KR); Joseph D. Chang, Yongin-si (KR); Byeong Wook Jeon, Seoul (KR); Tae Hee Cho, Hwaseong-si (KR)

(73) Assignees: Hyundai Motor Company, Seoul (KR); KIA Motors Corporation, Seoul (KR)

( * ) Notice: Subject to any disclaimer, the term of this patent is extended or adjusted under 35 U.S.C. 154(b) by 72 days.

(21) Appl. No.: 15/717,119

(22) Filed: Sep. 27, 2017

(65) Prior Publication Data

US 2018/0170387 A1    Jun. 21, 2018

(30) Foreign Application Priority Data

Dec. 15, 2016   (KR) ........................ 10-2016-0171856

(51) Int. Cl.
*B60W 30/18* (2012.01)
*B60W 10/22* (2006.01)
(Continued)

(52) U.S. Cl.
CPC ... *B60W 30/18145* (2013.01); *B60G 17/0162* (2013.01); *B60G 17/0195* (2013.01);
(Continued)

(58) Field of Classification Search
CPC ...... B60W 10/06; B60W 10/10; B60W 10/22; B60W 30/045; B60W 30/18145; B60G 17/0162
See application file for complete search history.

(56) References Cited

U.S. PATENT DOCUMENTS

| 8,744,689 B2 * | 6/2014 | Yamakado | .......... B60W 30/045 |
| | | | 701/44 |
| 2007/0219700 A1 * | 9/2007 | Makiyama | ......... B60G 17/0162 |
| | | | 701/72 |

(Continued)

FOREIGN PATENT DOCUMENTS

| EP | 1834816 A1 | 9/2007 |
| JP | 3673062 B2 | 7/2005 |

(Continued)

OTHER PUBLICATIONS

Jeon et al., Development of Smart Shift & Drive Control System based on the Personal Driving Style Adaptation, Korean Society of Automotive Engineers Spring Conference, May 2015, 23-32 (10 pages).

(Continued)

*Primary Examiner* — Hunter B Lonsberry
*Assistant Examiner* — Donald J Wallace
(74) *Attorney, Agent, or Firm* — Brinks Gilson & Lione

(57) ABSTRACT

The present disclosure provides a system for controlling cornering of a vehicle and a method thereof. The method of controlling cornering of a vehicle may include: determining whether a cornering control condition is satisfied based on a lateral acceleration; detecting a displacement of an accelerator pedal when the cornering control condition is satisfied; calculating a sport index based on the displacement of the accelerator pedal and a predetermined value; and setting operating modes of a power train and a suspension system based on at least one of the sport index or the lateral acceleration.

13 Claims, 4 Drawing Sheets

(51) Int. Cl.
    *B60W 10/06*     (2006.01)
    *B60W 10/10*     (2012.01)
    *B60G 17/016*     (2006.01)
    *B60W 30/045*     (2012.01)
    *B60W 40/09*     (2012.01)
    *B60G 17/0195*     (2006.01)
    *B60W 50/00*     (2006.01)

(52) U.S. Cl.
    CPC ............ *B60W 10/06* (2013.01); *B60W 10/10* (2013.01); *B60W 10/22* (2013.01); *B60W 30/045* (2013.01); *B60W 40/09* (2013.01); *B60G 2400/104* (2013.01); *B60G 2400/34* (2013.01); *B60G 2600/02* (2013.01); *B60W 2050/0095* (2013.01); *B60W 2520/125* (2013.01); *B60W 2540/10* (2013.01); *B60W 2710/06* (2013.01); *B60W 2710/10* (2013.01); *B60W 2710/22* (2013.01)

(56) References Cited

U.S. PATENT DOCUMENTS

| | | | |
|---|---|---|---|
| 2012/0209489 A1* | 8/2012 | Saito | B60T 7/042 701/70 |
| 2016/0046286 A1 | 2/2016 | Jeong et al. | |
| 2016/0129912 A1 | 5/2016 | Szwabowski et al. | |
| 2018/0043896 A1* | 2/2018 | Lee | B60L 7/18 |

FOREIGN PATENT DOCUMENTS

| | | |
|---|---|---|
| JP | 2007-060806 A | 3/2007 |
| JP | 4348602 B2 | 10/2009 |
| JP | 2012-158223 A | 8/2012 |
| KR | 10-0998231 B | 12/2010 |
| KR | 10-1575296 | 12/2015 |
| WO | WO2014/102099 A1 | 7/2014 |

OTHER PUBLICATIONS

European Search Report for Application No. EP17193158 dated May 2, 2018 (9 pages).

\* cited by examiner

SYSTEM FOR CONTROLLING CORNERING OF VEHICLE AND METHOD THEREOF

CROSS-REFERENCE TO RELATED APPLICATION

The present application claims priority to and the benefit of Korean Patent Application No. 10-2016-0171856, filed on Dec. 15, 2016, which is incorporated herein by reference in its entirety.

FIELD

The present disclosure relates to a system for controlling cornering of a vehicle, and more particularly, to a system for controlling cornering of a vehicle and a method thereof that determines a cornering state based on a lateral acceleration of the vehicle and controls an operating mode of a suspension system based on the lateral acceleration.

BACKGROUND

The statements in this section merely provide background information related to the present disclosure and may not constitute prior art.

Customer satisfaction in regards to driving performance of a vehicle depends on how precisely the vehicle conforms to a tendency of the customer. While tendencies of the customers vary, however, characteristic of the vehicle performance is normally set to one performance mode in the same vehicle model. Therefore, reaction of the vehicle may not correspond to the tendency of the customer. Accordingly, the customer often complains about the driving performance of the vehicle. That is, if the driving tendency of the customer is identified and a shift of the vehicle is controlled to correspond to the tendency of the customer, the customer satisfaction may be improved.

Recently, vehicle manufacturers have developed research on a smart shift. According to the smart shift, a driving tendency of a driver is learned and an operating mode suitable for a current state is automatically selected between a mild mode and a sport mode based on the learned driving tendency of the driver and shifting variables detected in a real time.

The driving tendency of the driver is mainly learned through an accelerator pedal, but the driver cannot press the accelerator pedal hard at a cornering state compared to driving straight. Therefore, the driving tendency of the driver learned at the cornering state is often misjudged as a mild. To inhibit this, how roughly the driver manipulate handling is determined using a lateral acceleration at the cornering state. Through this logic, even though the driver presses the accelerator pedal slightly at the cornering state, the driving tendency can be determined to be a sport if the driver roughly manipulate handling to increase the lateral acceleration.

In conventional arts, if it is determined that the driving tendency of the driver is sport, the operating modes of the power train and the suspension system are also changed to the sport modes. If the operating mode of the suspension system is changed to the sport mode, cornering performance of the vehicle may be improved. However, if a road condition is not good, the driver directly feels it and this may cause any displeasure to the driver.

SUMMARY

The present disclosure provides a system of controlling cornering of a vehicle and a method thereof having advantages of determining a cornering state based on a lateral acceleration of the vehicle and controlling an operating mode of a suspension system according to the lateral acceleration.

One form of the present disclosure provides a system of controlling cornering of a vehicle and a method thereof having further advantages of changing an operating mode of a suspension system based on a lateral acceleration and a driving tendency at a cornering state.

A system for controlling cornering of a vehicle in some forms of the present disclosure may include: a power train including an engine and a transmission; a suspension system connected to a driving wheel which receives power from the power train; a data detector configured to detect a lateral acceleration and a displacement of an accelerator pedal; and a vehicle controller configured to determine whether a cornering control condition is satisfied based on the lateral acceleration, calculate a sport index using the displacement of the accelerator pedal and a predetermined value when the cornering control condition is satisfied, and set operating modes of the power train and the suspension system based on at least one of the sport index or the lateral acceleration.

The vehicle controller may calculate a modified displacement by adding the displacement of the accelerator pedal and the predetermined value, and calculate the sport index based on the modified displacement.

The vehicle controller may set the predetermined displacement based on the lateral acceleration.

The vehicle controller may set the operating mode of the power train as a sport mode and set the operating mode of the suspension system as a mild mode when the sport index is greater than a reference index.

The vehicle controller may set the operating mode of the power train as a sport mode and set the operating mode of the suspension system to be the sport mode when the lateral acceleration is greater than a reference value and the sport index is greater than a reference index.

The vehicle controller may determine that the cornering control condition is satisfied when a number of times that the lateral acceleration is greater than a predetermined value within a predetermined duration is greater than or equal to a predetermined number of times.

The data detector may include: a lateral acceleration detector configured to detect the lateral acceleration; and an accelerator position sensor (APS) configured to detect the displacement of the accelerator pedal.

A method of controlling cornering of a vehicle in another form of the present disclosure may include: determining whether a cornering control condition is satisfied based on a lateral acceleration; detecting a displacement of an accelerator pedal when the cornering control condition is satisfied; calculating a sport index based on the displacement of the accelerator pedal and a predetermined value; and setting operating modes of a power train and a suspension system based on at least one of the sport index or the lateral acceleration.

The setting operating modes may include: determining whether the sport index is greater than a reference index; and setting the operating mode of the power train as a sport mode and the operating mode of the suspension system as a mild mode when the sport index is greater than the reference index.

The setting operating modes may include: determining whether the sport index is greater than a reference index; determining whether the lateral acceleration is greater than a reference value when the sport index is greater than the reference index; and setting the operating mode of the power train as a sport mode and the operating mode of the suspension system as the sport mode when the lateral acceleration is greater than the reference value.

The calculating a sport index may include: setting the predetermined displacement based on the lateral acceleration; calculating a modified displacement based on the displacement of the accelerator pedal and the predetermined value; and calculating the sport index based on the modified displacement.

The modified displacement may be calculated by adding the displacement of the accelerator pedal and the predetermined value.

The determining whether a cornering control condition is satisfied based on a lateral acceleration may include: determining whether a number of times that the lateral acceleration is greater than a predetermined value within a predetermined duration is greater than or equal to a predetermined number of times; and determining that the cornering control condition is satisfied when the number of times when the lateral acceleration is greater than the predetermined value within the predetermined duration is greater than or equal to the predetermined number of times.

After determining whether the cornering control condition is satisfied based on the lateral acceleration, the method may further include: determining whether a state that the lateral acceleration is lower than or equal to a predetermined value is maintained for a predetermined duration; and setting the operating modes of the power train and the suspension system as a mild mode, respectively when the state that the lateral acceleration is lower than or equal to the predetermined value is maintained for the predetermined duration.

The detecting the displacement of the accelerator pedal may include: determining whether the state that the lateral acceleration is lower than or equal to the predetermined value is maintained for the predetermined duration; and detecting the displacement of the accelerator pedal when the state that the lateral acceleration is lower than or equal to the predetermined value is not maintained for the predetermined duration.

Since a cornering state is determined based on a lateral acceleration and an operating mode of a suspension system is controlled based on an the lateral acceleration in some forms of the present disclosure, cornering performance may be improved.

In addition, since an operating mode of a suspension system is changed based on a lateral acceleration and a driving tendency at a cornering state, power performance may be improved.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
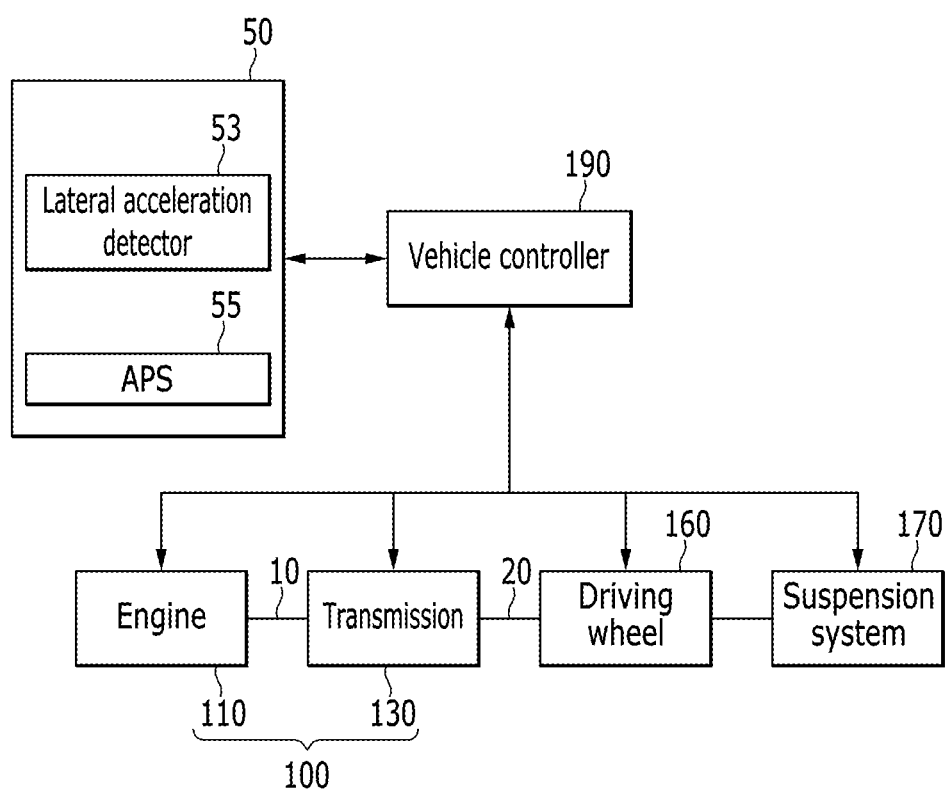
FIG. 1 is a block diagram of a system of controlling cornering of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a block diagram of a system of controlling cornering of a vehicle in some forms of the present disclosure.

Referring to FIG. 1, a system of controlling cornering of a vehicle in some forms of the present disclosure includes a data detector 50, a power train 100, a driving wheel 160, a suspension system 170 and a vehicle controller 190.

The data detector 50 detects a state data for controlling cornering of the vehicle. To this end, the data detector 50 includes a lateral acceleration detector 53 and an accelerator position sensor (APS) 55.

The lateral acceleration detector 53 detects a lateral acceleration (acceleration in a width direction of the vehicle) of the vehicle and transmits the detected lateral acceleration to the vehicle controller 190. The lateral acceleration detector 53 can detects the lateral acceleration periodically or non-periodically according to control of the vehicle controller 190.

The APS 55 detects how much a driver presses an accelerator pedal. That is, the APS 55 detects a position or a displacement of the accelerator pedal (i.e., how much the accelerator pedal is pressed) and transmits a signal corresponding thereto to the vehicle controller 190.

The power train 100 includes an engine 110 and a transmission 130.

The engine 110 burns fuel to generate power. That is, the engine 110 may be any one of well-known various engines such as a gasoline engine and a diesel engine, etc. using a typical fossil fuel. Power of the engine 110 may be transmitted toward the transmission 130.

The transmission 130 receives an output torque of the engine 110 as an input torque. The transmission 130 selects a suitable gear stage according to control of the vehicle controller 190, changes the input torque into a driving torque according to the gear stage, and delivers the changed driving torque to the driving wheel 160. Therefore, the vehicle can run with the driving torque.

That is, power generated by the engine 110 is transmitted to an input shaft 10 of the transmission 130, and power output from an output shaft 20 of the transmission 130 is transmitted to an axle. Since the axle transmits the power to the driving wheel 160, the vehicle can run by the power generated by the engine 110.

The suspension system 170 connects a vehicle body with the driving wheel 160. The suspension system 170 controls vibration or impact from a road when driving the vehicle not to be directly transmitted to the vehicle body such that damage of the vehicle body and freight is prevented and ride comfort is improved.

If internal force and external force due to driving, braking, or turning of the vehicle is applied to the vehicle, the suspension system 170 may improve handling performance to move the vehicle according to the driver's intention.

The vehicle controller 190 controls overall operation of the vehicle. The vehicle controller 190 is connected to the engine 110, the transmission 130 and the driving wheel 160 so as to control the engine 110, the transmission 130, the driving wheel 160 and the suspension system 170.

The vehicle controller 190 receives the state data from the data detector 50. The vehicle controller 190 determines whether a cornering control condition is satisfied based on the lateral acceleration included in the state data, and sets a sport index (SI) using the displacement of the accelerator pedal and a predetermined displacement if the cornering control condition is satisfied.

The vehicle controller 190 sets operating modes of the power train 100 and the suspension system 170 based on at least one of the sport index and the lateral acceleration. At this time, the operating mode includes a mild mode and a sport mode. The mild mode is an operating mode where smooth acceleration feel and ride comfort is provided, and the sport mode is an operating mode where a sport acceleration feel and dynamic driving is provided.

To this end, the vehicle controller 190 may be implemented by at least one processor operated by a predetermined program and the predetermined program may be programmed to perform each step of a method of controlling cornering of a vehicle in some forms of the present disclosure. The method of controlling cornering of a vehicle will be described in detail with reference to FIG. 2.

Figure 2:
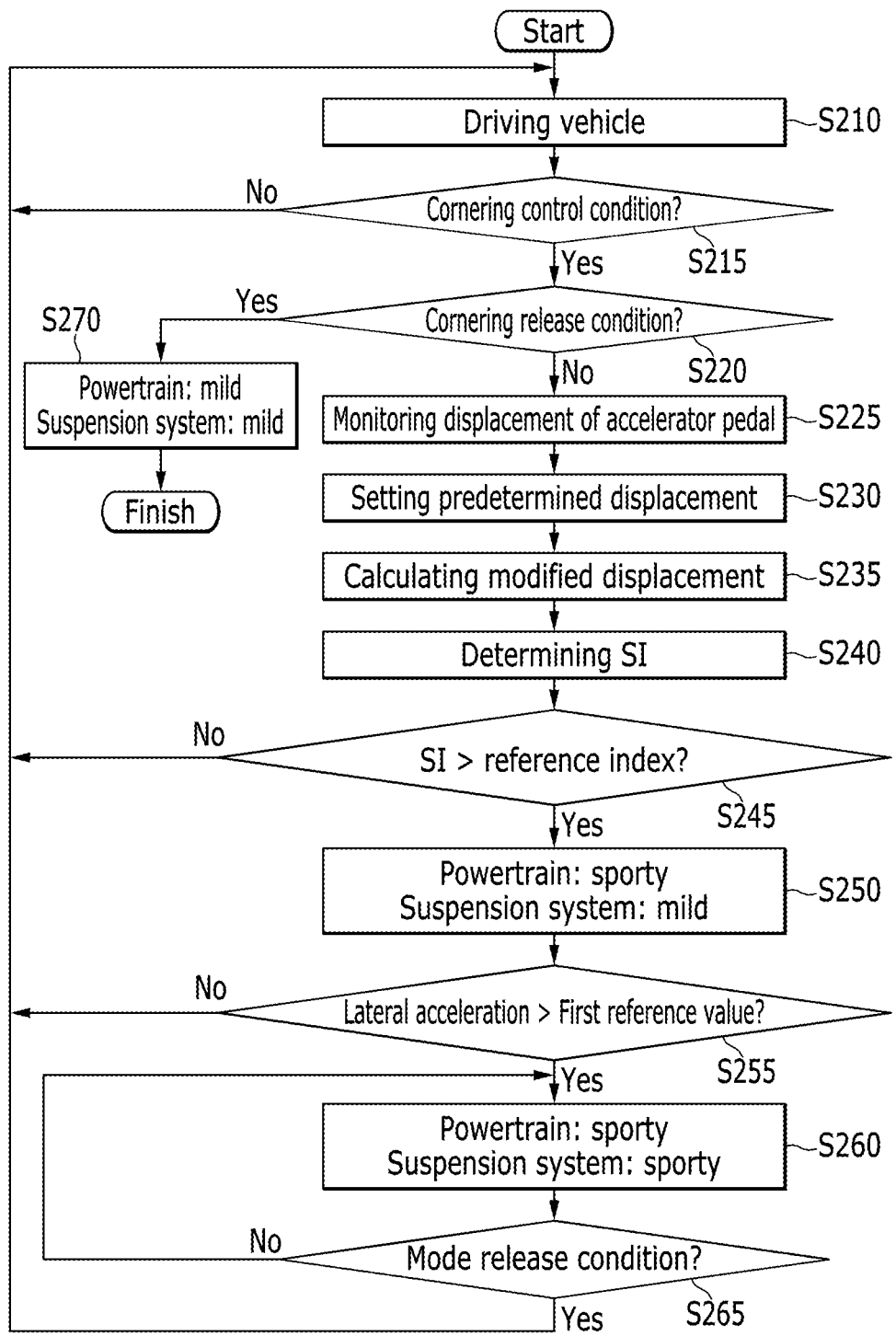
FIG. 2 is a flowchart of a method of controlling cornering of a vehicle.
Figure 3:
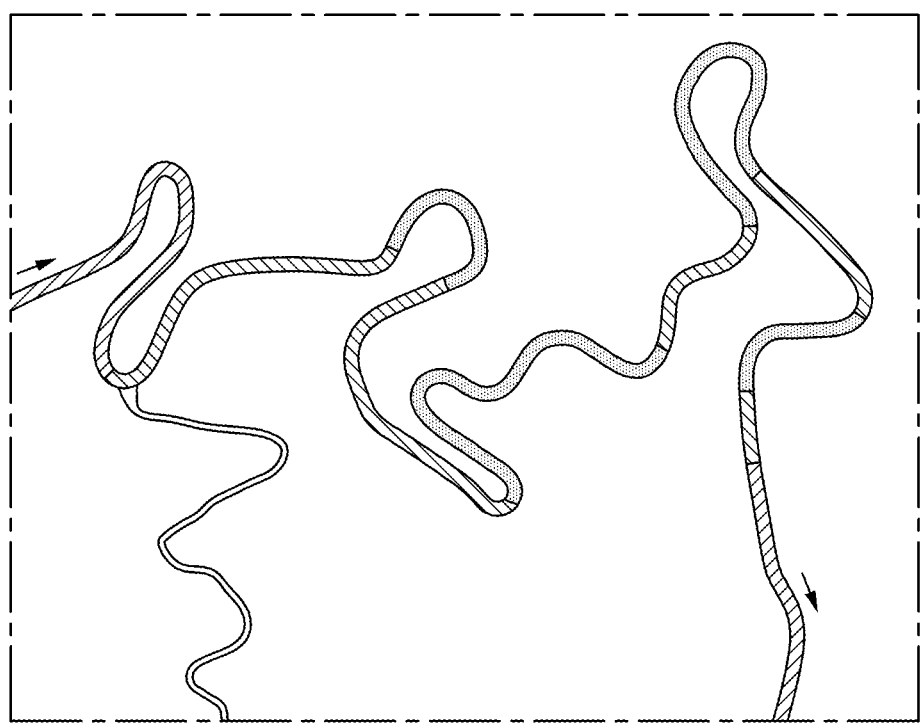
FIG. 3 is a schematic diagram illustrating an example where a method of controlling cornering of a vehicle is applied to a real driving.
Figure 3:
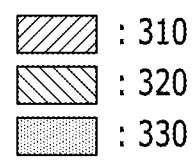

Referring to FIG. 2 and FIG. 3, the method of controlling cornering of a vehicle will be described.

FIG. 2 is a flowchart of a method of controlling cornering of a vehicle in some forms of the present disclosure.

Referring to FIG. 2, the vehicle controller 190 drives the vehicle according to demand of the driver at step S210. That is, the vehicle controller 190 confirms the demand of the driver based on the state data and controls the engine 110 and the transmission 130 to drive the vehicle according to the demand of the driver.

The vehicle controller 190 determines whether the cornering control condition is satisfied based on the lateral acceleration at step S215. In other words, the vehicle controller 190 receives the lateral acceleration of the vehicle from the lateral acceleration detector 53. The vehicle controller 190 determines whether the number of times when the lateral acceleration is greater than a predetermined value within a predetermined duration is greater than or equal to a predetermined number of times.

At this time, the predetermined duration, the predetermined value and the predetermined number of times are standard values for determining cornering of the vehicle. For example, the predetermined duration may be 20 second, the predetermined value may be 0.4, and the predetermined number of times may be 1.

The predetermined duration, the predetermined value and the predetermined number of times may be set through a predetermined algorithm (e.g., program and/or probability model).

In the meantime, the vehicle controller 190 returns to the step S210 to drive the vehicle if the cornering control condition is not satisfied.

The vehicle controller 190 determines whether a cornering release condition is satisfied at step S220 if the cornering control condition is satisfied. That is, if the number of times when the lateral acceleration is greater than the predetermined value within the predetermined duration is greater than or equal to the predetermined number of times (i.e., the cornering control condition is satisfied), the vehicle controller 190 determines whether a state where the lateral acceleration is lower than or equal to the predetermined value is maintained for a predetermined time. Here, the predetermined time represents a time for releasing the cornering control and may be set through a predetermined algorithm (e.g., program and/or probability model). For example, the predetermined time may be 15 second.

The predetermined time is required to prevent causing displeasure to the driver by frequent switch between the cornering control and release.

The vehicle controller 190 monitors the displacement of the accelerator pedal at step S225 if the cornering release condition is not satisfied. In other words, the vehicle controller 190 receives and monitors the displacement of the accelerator pedal from the APS 55 if the lateral acceleration is greater than the predetermined value or the state where the lateral acceleration is lower than or equal to the predetermined value is not maintained for the predetermined time.

The vehicle controller 190 sets the predetermined displacement at step S230. That is, the vehicle controller 190 sets the predetermined displacement according to the lateral acceleration.

The vehicle controller 190 calculates a modified displacement using the displacement of the accelerator pedal and the predetermined displacement at step S235. That is, the vehicle controller 190 calculates the modified displacement by adding the displacement of the accelerator pedal and the predetermined displacement.

The vehicle controller 190 determines the sport index based on the modified displacement at step S240. For example, the vehicle controller 190 sets a membership function based on the modified displacement by applying fuzzy control theory to the modified displacement, and determines the sport index from the membership function.

The vehicle controller 190 determines whether the sport index is greater than a reference index at step S245. Here, the reference index is a standard value for changing the operating modes of the power train 100 and the suspension system 170 and may be predefined. The reference index may be set through a predetermined algorithm (e.g., program and/or probability model).

Meanwhile, if the sport index is smaller than or equal to the reference index, the vehicle controller 190 returns to the step S220 to determine whether the cornering release condition is satisfied.

If the sport index is greater than the reference index, the vehicle controller 190 sets the operating modes of the train 100 and the suspension system 170 at step S250. That is, if the sport index is greater than the reference index, the vehicle controller 190 sets the operating mode of the power train 100 to be the sport mode and sets the operating mode of the suspension system 170 to be the mild mode. At this time, the vehicle controller 190 changes an engine torque map and a shift pattern map in order to control the power train 100 at the sport mode and drives the vehicle according to the changed engine torque map and the changed shift pattern map.

The vehicle controller 190 determines whether the lateral acceleration is greater than a first reference value at step S255. Here, the first reference value is a standard value for changing the operating mode of the suspension system 170 to be the sport mode and may be predetermined. The first reference value may be set through a predetermined algorithm (e.g., program or probability model). For example, the first reference value may be 0.45.

If the lateral acceleration is greater than the first reference value, the vehicle controller 190 sets the operating modes of the power train 100 and the suspension system 170 again at step S260. That is, if the lateral acceleration is greater than the first reference value, the vehicle controller 190 sets the operating mode of the power train 100 to be the sport mode and sets the operating mode of the suspension system 170 to be the sport mode. In addition, the vehicle controller 190 controls the power train 100 and the suspension system 170 based on the operating modes set at the step S260.

The vehicle controller 190 determines whether a mode release condition is satisfied at step S265. That is, the vehicle controller 190 determines whether a state where the lateral acceleration is smaller than or equal to a second reference value is maintained for a maintaining time. Here, the second reference value is a value for releasing the operating mode and may be predetermined. The second reference value may be set through a predetermined algorithm (e.g., program or probability model). For example, the second reference value may be 0.25.

If the mode release condition is satisfied, the vehicle controller 190 returns to the step S220 to determine whether the cornering release condition is satisfied.

If the mode release condition is not satisfied, the vehicle controller 190 returns to the step S260 to maintain the operating mode of the power train 100 to be the sport mode and maintain the operating mode of the suspension system 170 to be the sport mode. In addition, the vehicle controller 190 drives the vehicle based on the operating modes set at the step S260.

Meanwhile, if the cornering release condition is satisfied at the step S220, the vehicle controller 190 sets the operating modes of the power train 100 and the suspension system 170 at step S270. That is, if the state where the lateral acceleration is smaller than or equal to the predetermined value is maintained for the predetermined time, the vehicle controller 190 releases the cornering control. Therefore, the operating mode of the power train 100 is set to be the mild mode and the operating mode of the suspension system 170 is set to be the mild mode.

Figure 4:
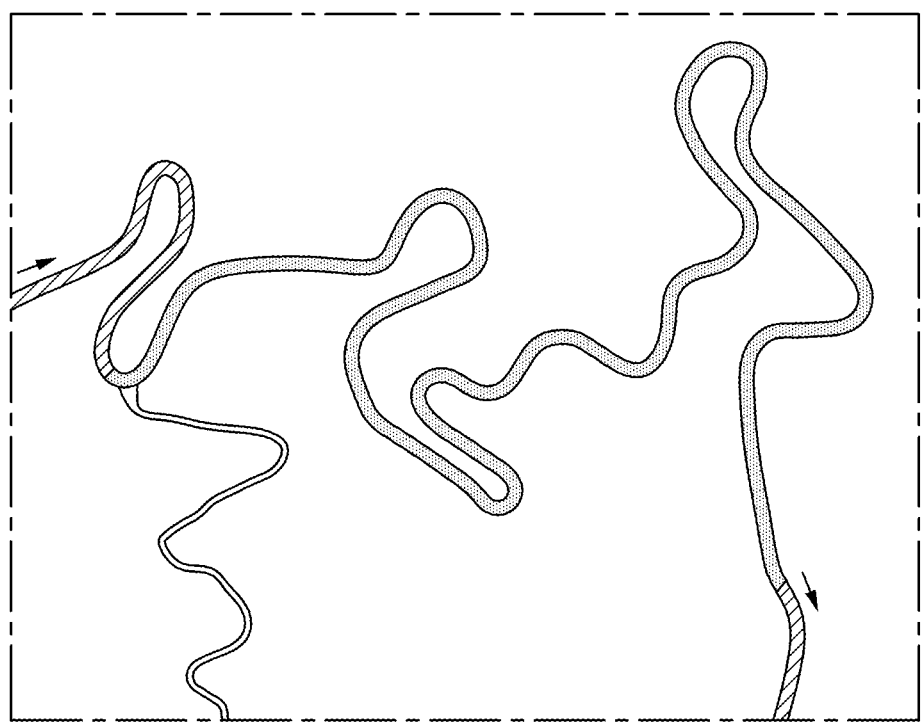
FIG. 4 is a schematic diagram illustrating an example where a conventional method of controlling cornering of a vehicle is applied to a real driving.

FIG. 3 is a schematic diagram illustrating an example where a method of controlling cornering of a vehicle is applied to a real driving, and FIG. 4 is a schematic diagram illustrating an example where a conventional method of controlling cornering of a vehicle is applied to a real driving.

Referring to FIG. 3, the vehicle controller 190 releases the cornering control to respectively set the operating modes of the power train 100 and the suspension system 170 to be the mild modes at a first road region 310, and controls the power train 100 and the suspension system 170 at the mild mode.

In addition, the vehicle controller 190 sets the operating mode of the power train 100 to be the sport mode and sets the operating mode of the suspension system 170 to be the mild mode at a second road region 320. After that, the vehicle controller 190 controls the power train 100 at the sport mode and controls the suspension system 170 at the mild mode to drive the vehicle.

In addition, the vehicle controller 190 sets the operating mode of the power train 100 to be the sport mode and sets the operating mode of the suspension system 170 to be the sport mode at a third road region 330. After that, the vehicle controller 190 controls the power train 100 at the sport mode and controls the suspension system 170 at the sport mode to drive the vehicle.

According to a conventional art shown in FIG. 4, both of the power train 100 and the suspension system 170 are controlled at the sport mode at both of the second road region 320 and the third road region 330. However, in some forms of the present disclosure, the operating modes of the power train 100 and the suspension system 170 at the second road region 320 are different from those of the power train 100 and the suspension system 170 at the third road region 330. In addition, a release timing from the cornering control in some forms of the present disclosure is faster than that of the conventional art. Therefore, cornering performance and power performance may be improved.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for controlling cornering of a vehicle, the system comprising:
    a power train comprising an engine and a transmission;
    a suspension system connected to a driving wheel, wherein the driving wheel is configured to receive power from the power train;
    a data detector configured to detect a lateral acceleration and a displacement of an accelerator pedal; and
    a vehicle controller configured to:
        determine whether a cornering control condition is satisfied based on the lateral acceleration;
        when the cornering control condition is satisfied, calculate a sport index based on the displacement of the accelerator pedal and a predetermined value;
        set operating modes of the power train and the suspension system based on at least one of the sport index or the lateral acceleration;
        calculate a modified displacement by adding the displacement of the accelerator pedal and the predetermined value; and
        calculate the sport index based on the modified displacement.

2. The system of claim 1, wherein the vehicle controller is configured to set a predetermined displacement based on the lateral acceleration.

3. The system of claim 1, wherein, when the sport index is greater than a reference index, the vehicle controller is configured to:
    set the operating mode of the power train as a sport mode; and
    set the operating mode of the suspension system as a mild mode.

4. The system of claim 1, wherein, when the lateral acceleration is greater than a reference value and the sport index is greater than the reference index, the vehicle controller is configured to:
    set the operating mode of the power train as a sport mode; and
    set the operating mode of the suspension system as the sport mode.

5. The system of claim 1, wherein, when a number of times that the lateral acceleration is greater than the predetermined value within a predetermined duration is greater than or equal to a predetermined number of times, the vehicle controller is configured to determine that the cornering control condition is satisfied.

6. The system of claim 1, wherein the data detector further comprises:
    a lateral acceleration detector configured to detect the lateral acceleration; and
    an accelerator position sensor configured to detect the displacement of the accelerator pedal.

7. A method of controlling cornering of a vehicle, the method comprising:
- determining whether a cornering control condition is satisfied based on a lateral acceleration;
- when the cornering control condition is satisfied, detecting a displacement of an accelerator pedal;
- calculating a sport index based on the displacement of the accelerator pedal and a predetermined value; and
- setting operating modes of a power train and a suspension system based on at least one of the sport index or the lateral acceleration,
- wherein setting the operating modes comprises:
  - determining whether the sport index is greater than a reference index; and
  - when the sport index is greater than the reference index, setting the operation mode of the power train as a sport mode and the operating mode of the suspension system as a mild mode.

8. The method of claim 7, wherein determining whether the cornering control condition is satisfied based on the lateral acceleration further comprises:
- determining whether a number of times that the lateral acceleration is greater than a predetermined value within a predetermined duration is greater than or equal to a predetermined number of times; and
- when the number of times that the lateral acceleration is greater than the predetermined value within the predetermined duration is greater than or equal to the predetermined number of times, determining that the cornering control condition is satisfied.

9. The method of claim 7, wherein determining whether the cornering control condition is satisfied based on the lateral acceleration further comprises:
- determining whether a state that the lateral acceleration is lower than or equal to the predetermined value is maintained for a predetermined duration; and
- when the state that the lateral acceleration is lower than or equal to the predetermined value is maintained for the predetermined duration, setting the operating modes of the power train and the suspension system as the mild mode, respectively.

10. The method of claim 7, wherein detecting the displacement of the accelerator pedal further comprises:
- determining whether a state that the lateral acceleration is lower than or equal to the predetermined value is maintained for a predetermined duration; and
- when the state that the lateral acceleration is lower than or equal to the predetermined value is not maintained for the predetermined duration, detecting the displacement of the accelerator pedal.

11. A method of controlling cornering of a vehicle, the method comprising:
- determining whether a cornering control condition is satisfied based on a lateral acceleration;
- when the cornering control condition is satisfied, detecting a displacement of an accelerator pedal;
- calculating a sport index based on the displacement of the accelerator pedal and a predetermined value; and
- setting operating modes of a power train and a suspension system based on at least one of the sport index or the lateral acceleration,
- wherein setting the operating modes comprises:
  - determining whether the sport index is greater than a reference index;
  - when the sport index is greater than the reference index, determining whether the lateral acceleration is greater than a reference value; and
  - when the lateral acceleration is greater than the reference value, setting the operating mode of the power train as a sport mode and the operating mode of the suspension system as the sport mode.

12. A method of controlling cornering of a vehicle, the method comprising:
- determining whether a cornering control condition is satisfied based on a lateral acceleration;
- when the cornering control condition is satisfied, detecting a displacement of an accelerator pedal;
- calculating a sport index based on the displacement of the accelerator pedal and a predetermined value; and
- setting operating modes of a power train and a suspension system based on at least one of the sport index or the lateral acceleration,
- wherein calculating the sport index further comprises:
  - setting a predetermined displacement based on the lateral acceleration;
  - calculating a modified displacement based on the displacement of the accelerator pedal and a predetermined value; and
  - calculating the sport index based on the modified displacement.

13. The method of claim 12, wherein the modified displacement is calculated by adding the displacement of the accelerator pedal and the predetermined value.

* * * * *